Oct. 27, 1942.  O. M. JENSEN ET AL  2,300,047
HYDRAULICALLY CONTROLLED METAL HACK SAW
Filed March 2, 1940  2 Sheets-Sheet 1
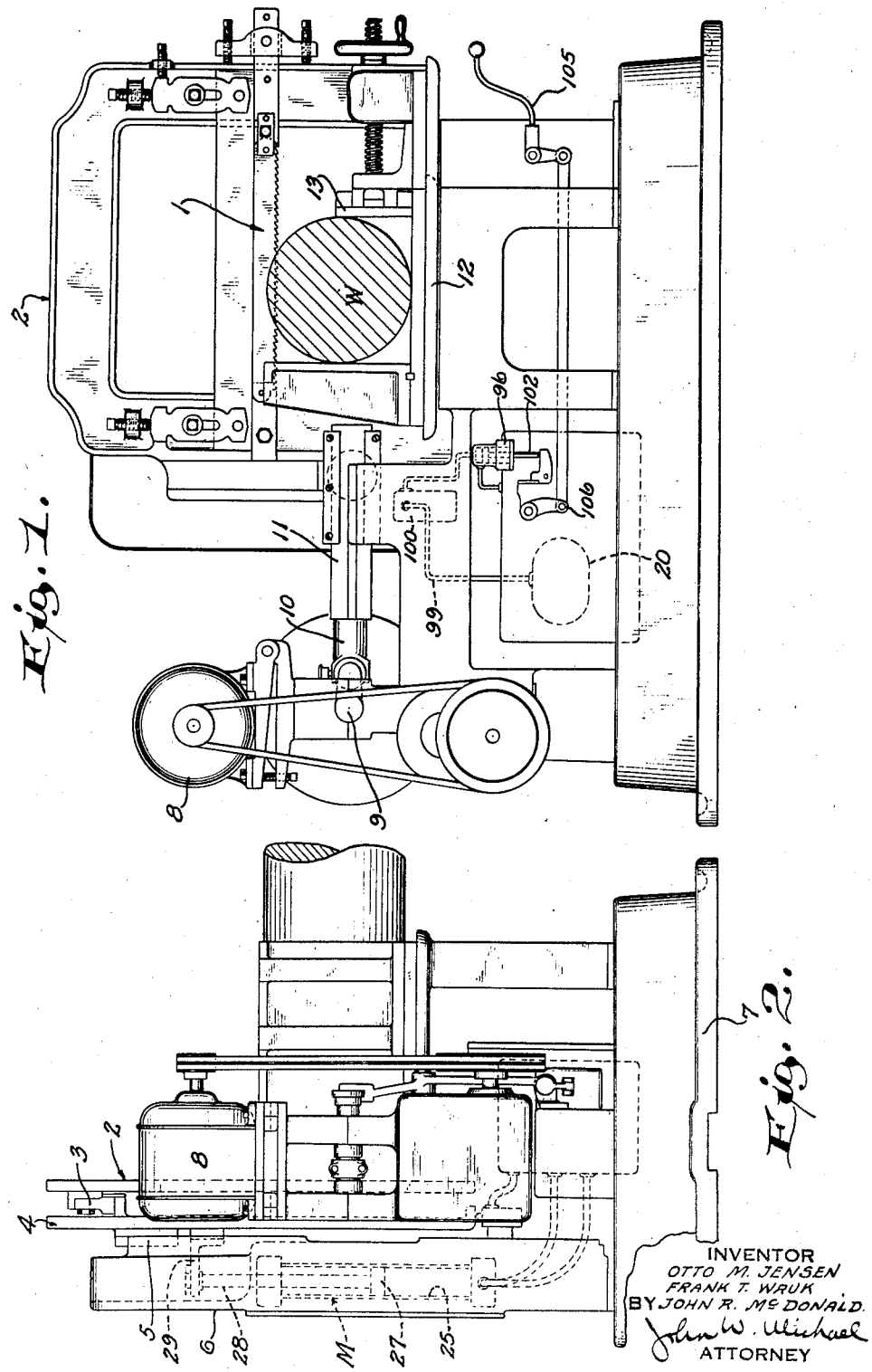
INVENTOR
OTTO M. JENSEN
FRANK T. WRUK
BY JOHN R. McDONALD.
John W. Michael
ATTORNEY Oct. 27, 1942.   O. M. JENSEN ET AL   2,300,047
HYDRAULICALLY CONTROLLED METAL HACK SAW
Filed March 2, 1940   2 Sheets-Sheet 2
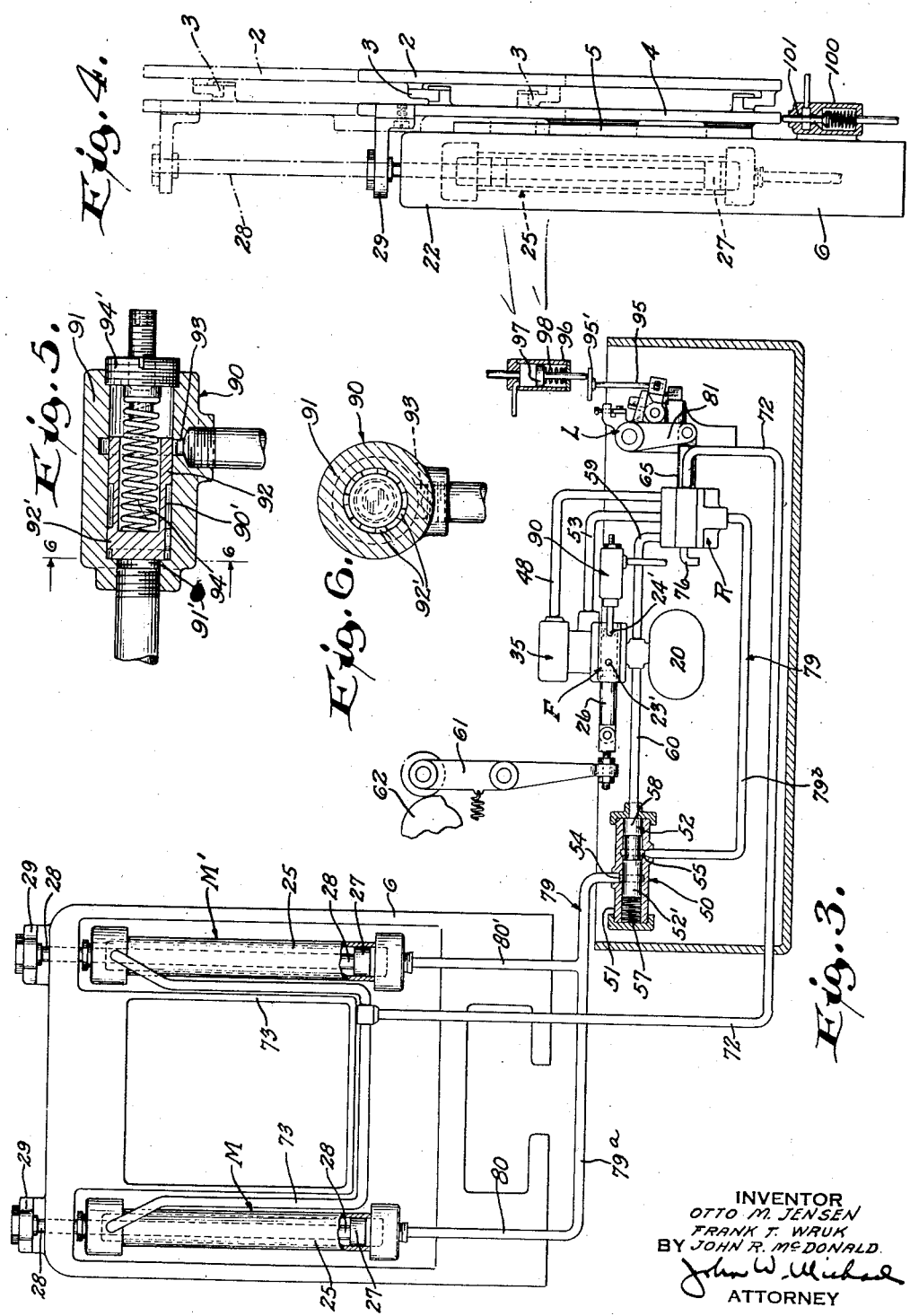
INVENTOR
OTTO M. JENSEN
FRANK T. WRUK
BY JOHN R. MCDONALD
ATTORNEY Patented Oct. 27, 1942

2,300,047

UNITED STATES PATENT OFFICE 2,300,047

HYDRAULICALLY CONTROLLED METAL HACK SAW

Otto M. Jensen and Frank T. Wruk, Racine, and John R. McDonald, Milwaukee, Wis., assignors to Peerless Machine Company, Racine, Wis., a corporation of Wisconsin Application March 2, 1940, Serial No. 321,862

6 Claims. (Cl. 29—73)

This invention relates to a metal sawing machine of the type employing a hydraulic feed or hydraulic means for controlling the position and action of the vertically movable carriage upon which the saw frame carrying the saw blade is mounted in such wise as to be constrained to vertical movement therewith while free to horizontally reciprocate with respect thereto.

One of the objects of the present invention is to provide a metal sawing machine of this character in which the weight of the vertically movable carriage and its horizontally reciprocable saw frame and associate parts are counterbalanced hydraulically and thereby rendered readily responsive to the feeding movements which must be imparted thereto during the sawing operation. In this connection it is to be appreciated that on each sawing stroke, the carriage and saw frame, and consequently the saw, must be forced or fed into the work, whereas on each return stroke, the carriage, saw frame, and saw must be lifted to lift the teeth of the saw blade out of operative engagement with the work. The carriage and saw frame and associated parts are very heavy and the operation is essentially an extremely rapid one; hence, the importance of rendering the saw carriage, saw frame, and saw blade readily responsive to the mechanism which effects or carries out the operations incidental to the feed.

Another object of the invention is to provide the hydraulic means for controlling the vertical movements of the saw carriage, saw frame, and saw of such character that after the completion of the sawing operation these parts will be automatically returned to their uppermost or idle position. Furthermore, upon shut-down of the pump, which serves as a source of supply of the fluid under pressure, the parts will be automatically locked in position and held against gradual downward movement, which might occur as a result of seepage or leakage of the fluid under pressure, were not provision made to preclude any such action. Here again the fact that the parts are of considerable weight makes this feature of the invention a matter of substantial importance, in that it precludes the possibility of damage or injury to the parts as a result of uncontrolled movement thereof.

Another object of the invention is to provide a hydraulically operated metal sawing machine of this character, which is simple and durable in construction, closely and compactly organized, reliable and efficient in operation, and easy and comparatively inexpensive to manufacture and maintain.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view in side elevation showing a hydraulically operated metal sawing machine embodying the present invention.

Figure 2 is a fragmentary view in end elevation of the machine shown in Figure 1.

Figure 3 is a diagrammatic view in elevation illustrating the hydraulic means for controlling movements of the carriage, saw frame, and saw, and showing how this hydraulic means is constituted to effect the desired circulation and control of fluid under pressure.

Figure 4 is a diagrammatic view in end elevation of the saw mill carriage and saw frame, and showing how these parts are combined with the stationary frame;

Figure 5 is a detailed sectional view illustrating the construction of the valve which is employed to counter-balance the saw carriage, saw frame, and saw; and Figure 6 is a view in transverse section on line 6—6 of Figure 5.

Referring to the drawings, it will be seen that the metal sawing machine embodying the present invention is, except for the hydraulic means which controls the saw carriage, saw frame, and saw, of the same general type as is described and claimed in United States Letters Patent No. 1,598,011, granted August 21, 1926, to Charles Rasmussen, and assigned to the Peerless Machine Company, of Racine, Wisconsin, the assignee of the present invention. Furthermore, the hydraulic feed employed, although improved and supplemented in certain respects, as will be pointed out, actually also embodies the construction described and claimed in the application of Otto M. Jensen, Frank T. Wruk, and Thomas W. Whitley, for Hydraulic feed for power driven hack saws, filed December 24, 1936, Serial No. 117,526, and issued May 28, 1940, as Patent No. 2,202,256 and assigned to the said Peerless Machine Company, the assignee of this application.

As illustrated in the drawings, the sawing machine, just as in the patent referred to, comprises a saw blade 1 fastened to and reciprocated with a four-sided saw frame 2. The saw frame 2 is supported for horizontal reciprocation by means of suitable guides or ways 3 on a carriage 4, which is in turn supported for vertical movement by suitable guides or ways 5 on a stationary frame 6 which upstands from the base 7 of the machine.

For the purpose of reciprocating the saw frame 2 and saw blade 1, a motor 8 is provided and operates through suitable gearing to rotate a crank shaft 9. A connecting rod 10, actuated from a crank in the crank shaft 9, is pivotally connected with a cross head 11, which is suitably interconnected with the saw frame 2 to reciprocate the same when the motor is running. The work, designated at W, is clamped on the work bed or cutting bed 12 of the machine by means of a suitable work-holder 13. Reference is to be made to the aforesaid patents for a complete disclosure of the general structure of the metal sawing machine.

The present invention provides two vertically disposed fluid pressure motors M and M' for moving the carriage 4 vertically along its guides or ways 5. There is one such motor at each side of the carriage so as to provide a balanced arrangement. The motors are of identical construction and each includes a cylinder 25 suitably fixed or anchored to the stationary frame 6 of the machine. A piston 27 is fitted in each cylinder 25 and is carried by the lower end of a piston rod 28. Each piston rod passes up through a stuffing box provided therefor in the upper end of its cylinder and is fixedly secured in any suitable fashion to the laterally propecting portion of an attaching bracket 29, which is in turn fixed to the upper part of the carriage 4. The motors M and M' are of the double-acting type—that is, fluid under pressure is selectively supplied to either side of their pistons, and, of course, when it is supplied to one side, it is exhausted from the other.

The supply and exhaust of fluid under pressure to the cylinders of the motors M and M' is regulated largely by the provision of a hydraulic feed, which is, except as will be hereinafter particularly pointed out, identical with that described and claimed in the aforesaid application Ser. No. 117,526. In describing how the elements of this hydraulic feed are combined with the features constituting the present invention, the same reference characters employed in said application Serial No. 117,526 will be used in this specification whenever specific elements of the said hydraulic feed are mentioned.

As fully disclosed in said application, the hydraulic feed includes a feed control valve F having a piston valve 26 operated automatically from and in synchronism with the crank shaft 9 by means of a cam 62 rotated with the crank shaft and serving to oscillate a cam lever 61, which is connected with the piston valve 26. A cylinder with a valved piston arrangement, designated as a whole at 35, is combined with the feed control valve F to limit the extent to which the carriage is lifted upon each return stroke of the saw. The hydraulic feed also includes a full return valve R, which is automatically operated when the cut has been completed to block off the valved piston and the feed control valve from communication with the motors M and M' and provide for a quick and smooth return of the carriage, saw frame, and saw to their starting position independently of the cylinder and valved piston arrangement 35 and feed control valve F. Of course, this return control valve R may be operated manually at any time. The details of the feed control valve F, the cylinder with valved piston 35, full return control valve R, and the latching and operating mechanism L for the full return valve R need not be fully described here since per se they form no part of the present invention, and since they are fully described and claimed in the said application Ser. No. 117,526.

For the purpose of the present invention it is sufficient to understand that during the operation of the machine the feed control valve F, and the cylinder and valved piston 35, serve, on each sawing stroke, to establish communication between the pump 20 and pipe line 48, the return valve R acting at this time to establish communication between the pipe line 48 and pipe line 72. The pipe line 72 corresponds to pipe line 72 in said application Serial No. 117,526, save that it has branches 73 connected with the interior of the upper ends of the cylinders 25 of the motors M and M'. The pipe line 72 must, of course, have such branches in order to serve the two motors employed in this instance rather than the single motor of said application. The lower ends of the cylinders 25 are connected to the branches 80 and 80' of a fluid pressure line 79. Whenever the machine is in operation, that is when the pump is running, the passageway through the pipe line 79 is unobstructed since at that time the valve 50, which is incorporated in this line, is open. However, whenever the pump stops, this valve closes to automatically lock the saw carriage and frame and saw against uncontrolled downward movement. This is one of the novel features of the present invention.

On each sawing stroke, while the feed control valve F, cylinder and valved piston 35 and return valve R are acting to supply fluid under pressure to the upper ends of the cylinders 25, as above described, the return valve R and feed control valve F are allowing fluid under presure to be exhausted from the lower ends of the cylinders 25 since the return valve R, at such time, establishes communication between the pipe 79 and the pipe 53, and the feed control valve F establishes communication between the pipe 53 and the exhaust port 24' of the feed control valve F. And while the present invention proposes to combine a special type of valve 90 with the exhaust port 24', this valve 90 insures the proper exhaust of the fluid under pressure, as will hereinafter more clearly appear.

The valve 50 comprises a cylindrical valve casing 51 containing a piston valve 52, the piston valve being slidably fitted in the casing and having a piston head 52', which in one position of the valve overlaps a port 54 in the casing. The port 54 is connected to section 79a of the supply line 79. The other section 79b of the supply line 79 is threaded into a second port 55 in the casing 51, which communicates freely with the interior of the valve casing. The valve is biased to closed position by means of a spring 57. A piston head 58 at the end of the valve opposite the piston head 52' is presented to one end of the valve casing. A pressure line 69 connects such end of the valve casing with a passage leading from the delivery end of the pump 20. Consequently, whenever the pump is running the pressure will be exerted through the line 69 and against the face of the piston 58, thereby forcing the valve into a position which will permit its annular groove or reduced portion between the piston heads to bridge the space between the ports 54 and 55 of the valve casing and allow free flow of the fluid under pressure through the valve 50.

The present invention proposes to hydraulically counterbalance the weight of the saw mill carriage, saw frame, and saw, and accomplishes this, generally speaking, by providing a spring-loaded relief or exhaust valve in the exhaust line. One practical way of accomplishing this purpose is to connect the valve 90 to the exhaust port 24' of the feed control valve F. As illustrated to advantage in Figure 5, the valve 90 includes a casing 91, one end of which has an inlet port 91' connected by a short pipe, or in any other suitable way to the exhaust port 24'. A piston valve 90' is slidably fitted in the casing 91 and has its head presented to the inlet port 91'. Adjacent its head the piston valve has angularly spaced peripheral guide lugs 92' and rearwardly of the guide lugs the piston valve is provided with a sleeve-like valve member proper designated at 92. The sleeve-like valve member 92 is controllably related to the exhaust port 93 of the valve casing. A spring 94, which may be adjusted as to tension by adjusting its abutment 94', is engageable with the valve and tends to hold it in the position wherein its sleeve-like valve member 92 closes its exhaust port. The spring is loaded to the extent necessary to counterbalance exactly the weight of the saw mill carriage, saw frame, and saw, and when any additional force is applied to this assembly, tending to move it downwardly, the valve 90 automatically opens and allows oil to exhaust therethrough and flow back into the sump or tank from which the pump draws it off.

The return valve has its valve member proper in the form of a sliding plunger or piston 65 controlled as to position by a valve-operating lever 81. During the time the saw is making a cut the latching mechanism L holds the valve plunger 65 in proper position, and at the end of a cut this latching mechanism is automatically tripped to cause the valve plunger 65 to be shifted to a position where it blocks off the cylinder and valved piston 35 and the feed control valve F and provides for a quick and smooth return of the carriage, saw frame, and saw to their starting position. In accomplishing this, the return valve R establishes communication between the pipe line 59 which is in open communication with the delivery side of the pump and the fluid with the delivery side of the pump and the fluid pressure supply line 79, so that fluid under pressure is supplied to the lower ends of both cylinders 25. At the same time this sliding plunger 65 establishes communication between the pipe line 72 and the exhaust fitting 76 so that the fluid under pressure is exhausted from the upper ends of the cylinders. In these particulars the construction is identical with that of said application Ser. No. 117,526, and the present invention differs therefrom only in the means of tripping latching mechanism L. Instead of having the stop rod 95 directly actuated by a lug or projection on the carriage, the present invention provides a fluid pressure motor 96 to trip the latching mechanism thereof. The fluid pressure motor 96 has its piston 97 biased to inoperative position by a spring 98. Fluid under pressure is supplied to the motor 96 from the pump 20 through a valve-controlled supply line 99. The valve in the supply line 99 is designated at 100 and is biased to closed position, but has its stem 101 projecting into the path of the lug or projection 96 on the carriage so that when a cut has been completed the lug or projection 96 on the carriage will coact with the stem 101 of the valve 100 to open the valve and allow fluid under pressure to flow to the motor 96. When fluid under pressure is supplied to the motor 97 its piston is moved downwardly, and its piston rod 102 acts either directly or indirectly on the latch of the latching mechanism. As illustrated diagrammatically in Figure 1, the piston rod 102 may be disposed to directly engage the latch of the latching mechanism, or, as illustrated in Figure 3, it may be disposed to engage the headed end 95' of the stop rod 95.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

We claim:

1. A metal sawing machine comprising a stationary frame, a carriage movably mounted thereon, a reciprocatory saw frame guided on the carriage for movement transversely to the movement of the carriage on the stationary frame, a saw secured to the saw frame, means for reciprocating the saw frame on the carriage, a fluid pressure motor connected to said carriage for imparting feeding movement thereto, a pump for supplying fluid under pressure, connections between the pump and said motor, a feed control valve incorporated in said connections and synchronized in its operation with the saw frame to cause the fluid under pressure to successively actuate the motor first in one direction and then in the other, said feed control valve having an exhaust to relieve the pressure on the side of the motor which allows the motor to actuate the saw frame to feed the saw into the work, and a spring-loaded valve combined with the exhaust of said feed control valve to counterbalance the weight of the carriage, saw frame, and saw, said spring-loaded valve including a valve member regulating the exhaust from the feed control valve, a pressure responsive member presented to the pressure in the exhaust from the feed control valve, and adjustable spring means opposing the action of said pressure responsive member.

2. A metal sawing machine comprising a stationary frame, a carriage movably mounted thereon, a reciprocatory saw frame guided on the carriage for movement transversely to the movement of the carriage on the stationary frame, a saw secured to the saw frame, means for reciprocating the saw frame on the carriage, a fluid pressure motor connected to said carriage for imparting feeding movement thereto, a pump for supplying fluid under pressure, connections between the pump and said motor, a feed control valve incorporated in said connections and synchronized in its operation with the saw frame to cause the fluid under pressure to successively actuate the motor first in one direction and then in the other, and a lock-up valve embodied in the connections between the feed control valve and that side of the motor which when energized moves the carriage, saw frame, and saw away from the work, said lock-up valve being responsive to pump pressure so as to be automatically opened when the pump is operating but being biased to closed position so as to block said last-named connection when said pump is stopped.

3. A metal sawing machine of the character described comprising a stationary frame, a carriage vertically shiftable thereon, a reciprocatory saw frame guided on the carriage for horizontal movement with respect thereto, a saw secured to the saw frame, means for reciprocating the saw frame on the carriage, a fluid pressure motor connected to said carriage for imparting feeding and return movements thereto, a pump for supplying fluid under pressure, connections between the pump and the motor, a feed control valve incorporated in said connections and synchronized in its operation with the saw frame, a return control valve also incorporated in said connection, said feed control valve and said return control valve cooperating during sawing to cause the fluid under pressure to successively actuate the motor first in one direction and then in the other, said return control valve being responsive to the movement of the carriage to effect return of the carriage to starting position after the completion of a cut, a lock-up valve interposed in the connections between the feed control valve and return control valve and said motor and having a valve member effective to lock the fluid in that side of the motor which must be exhausted to allow the carriage, saw frame, and saw to feed toward the work, a fluid pressure responsive member combined with said valve member, a connection between the pump and the fluid pressure responsive member whereby the fluid pressure responsive member will function to open the valve when the pump is running, and means for biasing the valve to closed position when the pump stops.

4. A hydraulic feed for a metal sawing machine of the character having a saw and means for reciprocating the saw and comprising a fluid pressure motor connected to the saw, a source of supply of fluid under pressure, means interposed between the source of supply of fluid under pressure and the motor for supplying fluid under pressure to the motor during each sawing stroke to cause the motor to feed the saw to the work and for reversing the action of the motor to cause it to withdraw the saw from the work during each return stroke, a return control valve associated with said last named means and with said motor and with said source of supply of fluid under pressure, latching means effective when latched to hold said return valve in position to provide for functioning of said last-named means in the manner stated and also effective when tripped to shift said return control valve to a position wherein said last-named means is shut off from communication with the motor and whereupon fluid under pressure is supplied from said source to said motor through said return control valve to cause said motor to return said saw to starting position, a servo-motor combined with said latching mechanism and effective when operated to trip the same, a connection between said source of supply of fluid under pressure and said servo-motor, a control valve in said connection biased to closed position, and means effective upon completion of a cut by the saw to open said control valve.

5. In a hydraulically operated hacksaw system, a source of fluid under pressure, a reciprocating fluid pressure motor operated by said fluid for feeding the saw, said motor having a feeding chamber and a return chamber, said return chamber having an outlet, and a valve biased to closed position in said outlet, said valve being opened by pressure from said source to permit escape of pressure from said outlet.

6. A metal sawing machine comprising a stationary frame, a carriage movably mounted thereon, a reciprocatory saw frame guided on the carriage for movement transversely to the movement of the carriage on the stationary frame, a saw secured to the saw frame, means for reciprocating the saw frame on the carriage, a fluid pressure motor operatively connected with said carriage, a valve controlled by the operation of said carriage and operable to supply said fluid to said motor to cause said motor to reverse its direction of operation, an exhaust outlet, said valve being operable to connect said outlet first to one side and then to the other side of said motor, and a spring-loaded valve in said outlet and adjusted to counterbalance the weight of the carriage, saw frame, and saw.

OTTO M. JENSEN.
FRANK T. WRUK.
JOHN R. McDONALD.